United States Patent [19]

Fischer, Jr.

[11] Patent Number: 4,769,053
[45] Date of Patent: Sep. 6, 1988

[54] HIGH EFFICIENCY SENSIBLE AND LATENT HEAT EXCHANGE MEDIA WITH SELECTED TRANSFER FOR A TOTAL ENERGY RECOVERY WHEEL

[75] Inventor: John C. Fischer, Jr., Marietta, Ga.

[73] Assignee: Semco Mfg., Inc., Vandiver, Mo.

[21] Appl. No.: 31,099

[22] Filed: Mar. 26, 1987

[51] Int. Cl.[4] .................. B01D 53/04; B01D 53/06
[52] U.S. Cl. ................................ 55/389; 55/181; 55/390
[58] Field of Search ............ 55/34, 60, 75, 78, 181, 55/389, 390

[56] References Cited

U.S. PATENT DOCUMENTS

| | | | |
|---|---|---|---|
| 3,024,867 | 3/1962 | Milton | 55/389 X |
| 3,024,868 | 3/1962 | Milton | 55/389 X |
| 3,266,973 | 8/1966 | Crowley | 55/389 X |
| 3,338,034 | 8/1967 | Hemstreet | 55/269 |
| 3,528,224 | 9/1970 | Warn | 55/179 |
| 3,666,007 | 5/1972 | Yoshino et al. | 55/158 X |
| 3,844,737 | 10/1974 | Macriss et al. | 55/34 |
| 3,889,742 | 6/1975 | Rush et al. | 55/390 X |
| 4,012,206 | 5/1977 | Macriss et al. | 55/34 |
| 4,093,435 | 6/1978 | Marron et al. | 55/390 X |
| 4,134,743 | 1/1979 | Macriss et al. | 55/34 |
| 4,172,164 | 10/1979 | Meyer et al. | 55/390 X |
| 4,255,171 | 5/1981 | Dravnieks | 55/269 |
| 4,365,979 | 12/1982 | Takeyama et al. | 55/390 X |
| 4,402,717 | 9/1983 | Izumo et al. | 55/390 X |
| 4,449,992 | 5/1984 | Yamada et al. | 55/158 |
| 4,529,420 | 7/1985 | Norbäck | 55/390 X |
| 4,595,403 | 6/1986 | Sago et al. | 55/389 |

FOREIGN PATENT DOCUMENTS

| | | | |
|---|---|---|---|
| 30863 | 6/1981 | European Pat. Off. | 55/390 |
| 133855 | 1/1979 | German Democratic Rep. | 55/390 |
| 19548 | 2/1979 | Japan | 55/390 |

OTHER PUBLICATIONS

Senex Energy Recovery Cargocaire Bulletin 3315 5/85.
Senex Enthalpy Recovery Technical Manual 10/84.

*Primary Examiner*—Robert Spitzer
*Attorney, Agent, or Firm*—Parmelee, Miller, Welsh & Kratz

[57] ABSTRACT

A sensible and latent heat exchange media comprises a gas permeable matrix. The gas permeable matrix provides passageways therethrough through which an air stream can flow through the sensible and latent heat exchange media. The gas permeable matrix is formed of a sensible heat exchange material that is capable of absorbing sensible heat from a warm air stream and releasing the absorbed sensible heat into a cool air stream as the air streams flow through the sensible and latent heat exchange media. A layer of a coating composition comprising a molecular sieve is applied to at least a portion of the surface of the sensible heat exchange material. The molecular sieve has a plurality of pores of a substantially uniform size such that the molecular sieve is capable of adsorbing moisture from a humid air stream flowing through the sensible and latent heat exchange media, and is capable of releasing the adsorbed moisture into a dry air stream flowing through the sensible and latent heat exchange media, but is not capable of adsorbing contaminants from either of the air streams. The sensible and latent heat exchange media is extremely efficient in transferring both sensible and latent heat between air streams.

24 Claims, 5 Drawing Sheets

HIGH EFFICIENCY SENSIBLE AND LATENT HEAT EXCHANGE MEDIA WITH SELECTED TRANSFER FOR A TOTAL ENERGY RECOVERY WHEEL

BACKGROUND OF THE INVENTION

The present invention relates generally to energy conservation apparatus for use in heating, ventilating and air conditioning (HVAC) systems. More particularly, the invention relates to total enthalpy air to air rotary energy exchangers, also known as total heat wheels and specifically to novel total heat exchange media employed in such wheels.

Rotary air to air energy exchangers are used in HVAC systems to recover both sensible energy (temperature) and latent energy (moisture) from an exhaust air stream and then exchange these with an incoming air supply stream. The ability to recover the latent energy represented by the moisture is of significant interest since it dehumidifies the outdoor air during the cooling cycle, and humidifies the outdoor air during the heating cycle so as to reduce the energy demands required to condition outdoor air by as much as 95 percent. Frost formation and subsequent freezing and plugging problems encountered in sensible heat exchangers in winter operations are also eliminated in most cases through the use of total energy exchangers, thus, making them of particular interest.

Heretofore, in the evolution of such wheels, the total heat exchange media was formed of a substrate of paper or asbestos material, impregnated or coated with a desiccant, typically a water soluble salt such as lithium chloride. Later, such enthalpy wheels contained total heat exchange media having an aluminum foil substrate with a surface coating of a desiccant material consisting of a dry film of silica gel, an oxidized surface or a separate coating of aluminum oxide. These later aluminum wheels exhibit greater strength and durability than the prior paper and asbestos media and also have the advantage in some cases of being capable of being washed with water and/or steam without harming the desiccant coating.

The sensible and latent heat exchange media used in the wheels are generally in the form of a matrix that provides air passages therethrough through which an air stream can flow. The matrices can take a variety of forms, such as a fibrous mesh or honeycomb. One type of honeycomb matrix is formed of a plurality of spaced, substantially parallel layers of a sheet material, particularly alternating layers of a corrugated sheet material and a flat sheet material. In the latter case, the corrugations are generally parallel and provide a plurality of axially extending passageways extending along the depth of the wheel.

Such a total energy recovery wheel, when placed between two air streams in counterflow, will enable sensible heat to be transferred between the two air streams. The air stream with the higher temperature will heat the sensible heat exchange material of the sensible and latent heat exchange media of the slowly rotating wheel which, in turn, heats the lower temperature air stream. Further, the wheel transfers the latent heat between two air streams of different absolute humidities. The desiccant portion of the sensible and latent heat exchange media of the wheel adsorbs moisture from the air stream of higher absolute humidity until reaching equilibrium with the air stream of higher absolute humidity and, as a result of the vapor pressure differential between the desiccant and the air stream of lower absolute humidity, will release the moisture to the air stream of a lower absolute humidity until reaching equilibrium with the air stream of lower absolute humidity. Absolute humidity is defined as pounds of moisture per pound of dry air and is distinguishable from relative humidity, which is defined as the ratio of the absolute humidity to the maximum possible density of water vapor in the air at a given temperature.

Thus, in the cooling mode, the energy recovery wheel cools and dries hot, humid incoming air by absorbing sensible heat and moisture from the incoming air. The sensible heat and moisture absorbed by the sensible and latent heat exchange media of the wheel are then transferred to the cool, dry outgoing air. As a result, the energy necessary to further cool and dehumidify the incoming air to the desired temperature and humidity is reduced.

In the heating mode, the energy recovery wheel heats and humidifies cool, dry incoming air by absorbing sensible heat and moisture from the warm, humid outgoing air. The sensible heat and moisture absorbed by the sensible and latent heat exchange media of the wheel are then transferred to the cool, dry incoming air. As a result, the energy necessary to further heat and humidify the incoming air to the desired temperature and humidity is reduced.

One problem associated with total energy recovery wheels arises from the fact that, generally, a typical wheel rotates at a rate of about twenty revolutions per minute. Thus, the wheel is in contact with each air stream for only about 1.5 seconds per revolution. The sensible heat exchange material and the desiccant must, therefore, be capable of absorbing the sensible and latent heat from and releasing the absorbed sensible and latent heat to the respective air streams very quickly.

A second problem with the use of such total energy recovery wheels is that desiccants heretofore used in the sensible and latent heat exchange media often adsorb and transfer contaminants found in the exhaust air stream along with the moisture. It should be noted that the most important reason for continuously exhausting air from an enclosed space and replacing it with fresh air is to remove air borne contaminants from the air in the enclosed space. Such undesirable contaminants include ammonia, hydrocarbons from solvents, carbon monoxide, nitrogen dioxide and sulfur dioxide. Desiccants such as activated alumina ($Al_2O_3$) and silica gel have a very wide pore size distribution, 8 Angstroms to 70 Angstroms and 8 Angstroms to 100 Angstroms, respectively. Oxidized aluminum surfaces have an even wider pore size distribution. This wide pore size distribution allows the desiccant to adsorb air borne contaminants as well as moisture from the air stream. Desiccants such as lithium chloride deliquesce to form an aqueous desiccant solution which absorbs all water soluble contaminants. These contaminants are then released back into the incoming air stream along with the moisture. Contaminants also use adsorptive capacity of the desiccant that would otherwise adsorb moisture.

Thus an object of the invention is to develop a sensible and latent heat exchange media that is considerably more efficient and faster acting than those currently available.

A further object of the invention is to develop a sensible and latent heat exchange media for a total energy recovery wheel that will adsorb the moisture from an air stream, but will not adsorb contaminants present in the exhaust air stream so that the contaminants will be purged along with the exhaust air stream rather than be desorbed into and recirculated with the incoming fresh air stream.

SUMMARY OF THE INVENTION

A sensible and latent heat exchange media comprises a gas permeable matrix. The gas permeable matrix provides passageways therethrough through which an air stream can flow through the sensible and latent heat exchange media. The gas permeable matrix is formed of a sensible heat exchange material that is capable of absorbing sensible heat from a warm air stream and releasing the absorbed sensible heat into a cool air stream as the air streams flow through the sensible and latent heat exchange media. A layer of a coating composition comprising a molecular sieve is applied to at least a portion of the surface of the sensible heat exchange material. The molecular sieve has a plurality of pores of a substantially uniform size, such that the molecular sieve is capable of adsorbing moisture from a humid air stream flowing through the sensible and latent heat exchange media, and is capable of releasing the adsorbed moisture into a dry air stream flowing through the sensible and latent heat exchange media, but is not capable of adsorbing larger contaminant molecules from either of the air streams.

The sensible and latent heat exchange media of the invention is particularly useful in a total energy recovery wheel comprising a hub, the sensible and latent heat exchange media of the invention, means for supporting the sensible and latent heat exchange media circumferentially about the hub, and drive means for rotating the total energy recovery wheel.

The sensible and latent heat exchange media of the invention is more efficient in absorbing and releasing both sensible and latent heat, and as a result, total energy recovery wheels utilizing the sensible and latent heat exchange media of the invention can be substantially more compact than those currently available while still being equally or more effective at similar pressure loss parameters.

Further, the molecular sieve in the coating composition adsorbs moisture in an air stream, but will not adsorb any of the contaminants in the air stream because of its specific pore size and polarity. Thus, the sensible and latent heat exchange media of the invention will adsorb latent heat without also adsorbing contaminants from the outgoing air stream and desorbing them to and recirculating them with the incoming air stream. This selectivity is not possible with the types of desiccants used heretofore in connection with sensible and latent heat exchange elements.

BRIEF DESCRIPTION OF THE DRAWINGS

These and other objects, features and advantages of the subject invention will become more fully apparent from the following detailed description and accompanying drawings in which.

DETAILED DESCRIPTION OF THE PREFERRED EMBODIMENTS

Figure 1:
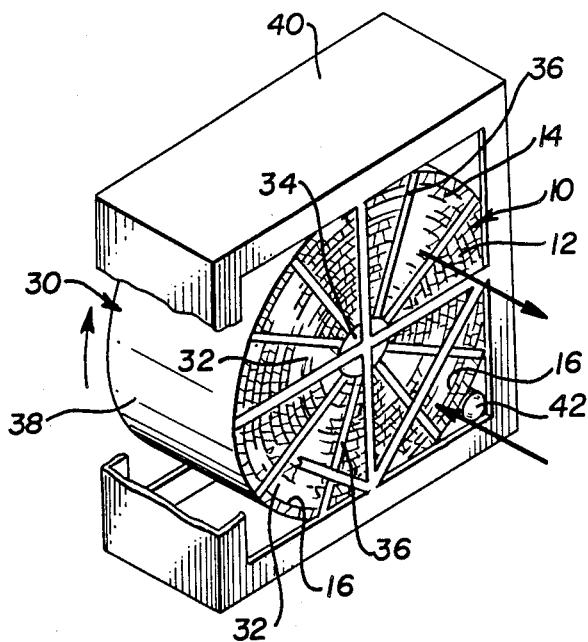
FIG. 1 is a perspective view of a total energy recovery wheel employing the sensible and latent heat exchange media of the subject invention.
Figure 2:
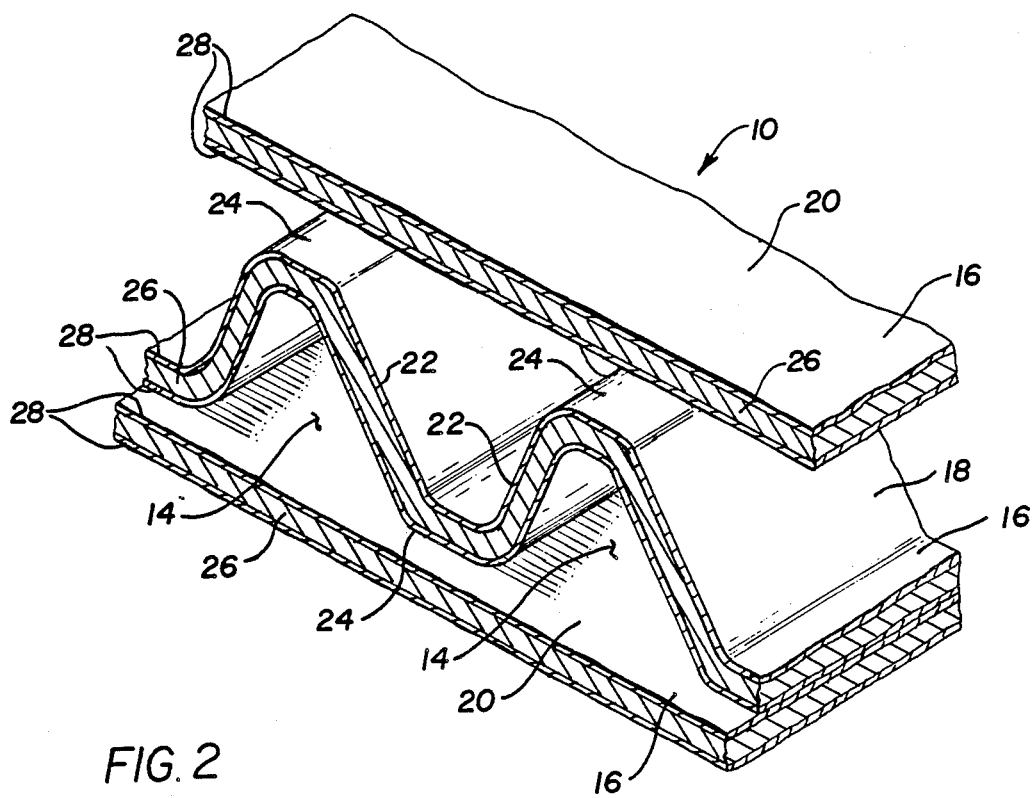
FIG. 2 is an enlarged, fragmentary, and exploded view of the sensible and latent heat exchange media of the total energy recovery wheel of FIG. 1.

The sensible and latent heat exchange media 10 of the invention is formed of a gas permeable matrix 12. The gas permeable matrix 12 includes a plurality of passageways 14 therethrough through which an air stream can flow through the sensible and latent heat exchange media 10.

Preferably, the gas permeable matrix 12 is formed of a plurality of spaced layers of a sheet material 16. Typically, the sheet material 16 is from about 1 mil to about 3 mils thick. More preferably, the layers of sheet material 16 are alternating layers of a corrugated sheet material 18 and a flat sheet material 20 that forms a honeycomb matrix. The corrugations 22 of the corrugated sheet material 18 are preferably substantially parallel to each other and are from about 50 mils to about 100 mils in height and from about 100 mils to about 200 mils in width. Most preferably, the corrugations 22 are slightly flattened at their apexes 24 in order to minimize the pressure loss in the air stream as the air stream flows through the passageways 14 of the sensible and latent heat exchange media 10 and to maximize the sensible heat and mass transfer coefficients of the sensible and latent heat exchange media 10. However, the corrugations 22 can be triangular or square. Further, gas permeable matrix 12 itself can take other forms, such as a fibrous mesh.

The substrate of the gas permeable matrix 12 is formed of a sensible heat exchange material 26. Suitable sensible heat exchange materials 26 include any material that is capable of absorbing sensible heat from a warm air stream and releasing the absorbed sensible heat into a cool air stream as the air streams flow through the sensible and latent heat exchange media 10. Preferably, the sensible heat exchange material 26 of the gas permeable matrix 12 is a metal foil such as aluminum or stainless steel. Other suitable, but less desirable, sensible heat exchange materials 26 include kraft paper, nylon fiber paper, mineral fiber paper, asbestos and plastic. The heat capacity of the sensible heat exchange material 26 and the overall surface area of the sensible heat exchange material 26 within the gas permeable matrix 12 are two factors in determining whether a material is a suitable sensible heat exchange material 26 for the sensible and latent heat exchange media 10. Surprisingly, the latter factor appears to be the more important of the two because of the short time, about 1.5 seconds, that the air streams are in contact with the moisture and heat exchange media 10.

A layer 28 of a coating composition is applied to at least a portion of the surface 30 of the sensible heat exchange material 26 of the gas permeable matrix 12. The coating composition comprises a molecular sieve. Molecular sieves are so named because of their ability to screen molecules based on the size of the molecules. Thus, molecular sieves differ from other adsorbents, such as silica gel and activated alumina, which have a very wide pore size distribution. Suitable molecular sieves are those having a plurality of pores of a substantially uniform size such that the molecular sieve is capable of adsorbing moisture from a humid air stream flowing through the sensible and latent heat exchange media 10, and is capable of releasing the adsorbed moisture into a dry air stream flowing through the sensible and latent heat exchange media 10, but is not capable of adsorbing contaminants from either of the air streams. Because water molecules have a critical diameter of 2.8 Angstroms and small contaminants such as ammonia and hydrogen sulfide have critical diameters of 3.6 Angstroms, the molecular sieves preferably have a pore diameter of about 3 Angstroms. It is easily understood that the pore diameter of the molecular sieve can be larger than about 3 Angstroms, such as about 4 Angstroms or about 5 Angstroms, depending on the environment in which the resultant sensible and latent heat exchange media 10 is to be used and the types of contaminants to which the sensible and latent heat exchange media 10 will be exposed.

Molecular sieves are materials whose atoms are arranged in a crystal lattice in such a way that there are a large number of interconnected uniformly sized pores. The pores are capable of adsorbing molecules of a size smaller than that of the pores, particularly water molecules. Molecular sieves, thus, can be used to adsorb and, thus, separate or screen molecules that are smaller than the pores from larger molecules. One class of molecular sieves are zeolites.

Zeolites are hydrated silicates of aluminum and sodium, potassium, and/or calcium, having the general formula: $Na_2O.Al_2O_3.nSiO_2.xH_2O$. Zeolites can be naturally occurring or artificial. Naturally occurring sieves include chabazite, thomosonite, heulandite, faujasite, permutite, analcite, erionite, natrolite, stilbite, and mordenite. However, not all of the natural zeolites exhibit molecular sieve characteristics, because the natural zeolites have a broader pore size distribution than is suitable for an efficient molecular sieve.

Artificial zeolites molecular sieves include zeolites A, D, L, R, S, T, X, and Y. Zeolite A is a crystalline zeolitic molecular sieve represented by the general formula: $1.0 \pm 0.2 M_{2-n}O:Al_2O_3:1.85 \pm 0.5 SiO_2:yH_2O$, wherein M represents metal, n is the valence of M, and y may be any value up to about 6. Zeolite X is a crystalline zeolitic molecular sieve represented by the general formula: $0.9 \pm 0.2 M_{2-n}O:Al_2O_3:2.5 \pm 0.5 SiO_2:yH_2O$, wherein M represents a metal, particularly alkaline and alkaline earth metals, n is the valence of M, and y may be any value up to about 8. The molecular sieves generally known in the art as 4 Angstrom molecular sieves have a pore diameter of about 4 Angstroms and are an alumino silicate of crystal structure A with sodium cations. The molecular sieves generally known in the art as 3 Angstrom molecular sieves are an alumino silicate of crystal structure A and with sodium and potassium cations. The 3 Angstrom molecular sieves are prepared by substituting most of the sodium cations in a 4 Angstrom molecular sieve with larger potassium cations. Thus, while most of the pores in 3 Angstrom molecular sieves are about 3 Angstroms in diameter, some of the pores are about 4 Angstroms in diameter. The molecular sieves generally known in the art as 5 Angstrom molecular sieves are an alumino silicate of crystal structure A with sodium and calcium cations. The 5 Angstrom molecular sieves are prepared by substituting most of the sodium cations in a 4 Angstrom molecular sieve with smaller calcium cations. Thus, while most of the pores in 5 Angstrom molecular sieves are about 5 Angstroms in diameter, some of the pores are about 4 Angstroms in diameter.

A further advantage provided by the molecular sieve with respect to the selective adsorption of water molecules is the polarity of the molecular sieve. Thus, preferred molecular sieves have a polarity so that they will preferentially attract water molecules over molecules, such as carbon monoxide, which have a polarity different from, but are similar in size to water molecules.

It had been thought that suitable desiccants for sensible and latent heat exchange media 10 must have a high overall capacity to adsorb moisture from an air stream, particularly over a range of from 20 percent to 90 percent relative humidity. Instead, it has been determined that the initial rates at which the desiccant adsorbs and desorbs the moisture from the air stream are more important considerations when the desiccant is to be used in a sensible and latent heat exchange media 10, because the air streams are in contact with the sensible and latent heat exchange media 10 for only about 1.5 seconds. Molecular sieves have the unique ability, among the desiccants typically used in sensible and latent heat exchange media, to absorb moisture from an air stream within that short time frame.

Because molecular sieves are chemically inert the presence of the molecular sieve in the layer 28 of a coating composition adds a degree of corrosion resistance to the latent and sensible heat exchange media 10.

The latent and sensible heat exchange media 10 of the invention can be prepared by coating a strip of the desired sensible heat exchange material 26, such as a strip of aluminum, with a binder having a dry film thickness of preferably at least about 0.2 mil, more preferably, from about 0.2 mil to about 0.7 mil, and most preferably about 0.5 mil. Suitable binders exhibit good adhesion to aluminum, are compatible with the sensible heat exchange material 26, and remain tacky for a suitable length of time, such as polyurethanes, nitrile-phenolics, water-based binders and, preferably, alkyd based resins having a solids content of between about 15 percent and about 25 percent, by weight in methyl ethyl ketone or toluene. The binder can be applied to the sensible heat exchange material 26 in any one of a number of ways, including dipping, spraying, and knife over roller coating. The binder composition preferably includes a solvent, such as toluene, so that the surface of the coating layer remains tacky for a sufficient time to allow for the application of the molecular sieve to the surface thereof.

After the binder has been applied to the sensible heat exchange material 26, the binder is dried, such as blown dry with hot air, until just slightly tacky. A layer of the desired molecular sieves, such as a 3 Angstrom molecular sieve, is then applied to the surface of the coated strip of sensible heat exchange material. Preferably, the coated strip of sensible heat exchange material 26 is continuously passed through a fluidized bed of the molecular sieve particles so that a substantially even layer of molecular sieve is deposited on the surface of the binder. Preferably, the molecular sieve particles have an average particle diameter of from fine powder to about 200 mesh. The completely coated surface of the sensible heat exchange material 26 is then dried to a tack free state, such as by using hot air. The same process is repeated to coat the other side of the sensible heat exchange material 26.

Alternatively, the coating composition can include both the molecular sieve and from about 5 percent to about 15 percent, by weight, of the binder. Suitable binders include those binders mentioned previously. It should be noted that, the binder and molecular sieve should be applied to the latent and sensible heat exchange material 26 so that the binder does not block the pores of the molecular sieve, thereby destroying the ability of the molecular sieve to function.

As illustrated in FIG. 1, the sensible and latent heat exchange media 10 of the invention is particularly useful in a total energy recovery wheel 30. The total energy recovery wheel 30 includes a hub 32 and the sensible and latent heat exchange media 10 circumferentially surrounding the hub 32.

The layer 28 of coating composition is washable with steam or water when in place as part of the sensible and latent heat exchange media 10 of a total energy recovery wheel 30.

In the preferred case, wherein the sensible and latent heat exchange media 10 is formed of a plurality of alternating layers of a corrugated sheet material 18 and a flat sheet material 20, an elongated strip of the corrugated sheet material 18 and an adjacent elongated strip of the flat sheet material 20 are wound circumferentially around a spool until the wound strips form a cylinder of the appropriate diameter. A suitable adhesive can be applied to the flat sheet material 20 prior to the flat sheet material 20 being paired with the corrugated sheet material 18 in order to adhere the two sheets together and to increase the structural integrity of the sensible and latent heat exchange media 10 and the resulting total energy recovery wheel 30. The wound cylinder is then cut axially into preferably eight pie-shaped sections 32. The pie-shaped sections 32 are then secured to a hub 34 so that they extend axially outwardly from the hub 34 between spokes 36 to form the total energy recovery wheel 30. A rim 38 is then secured around the outer circumference of the total energy recovery wheel 30. The total energy recovery wheel 30 is mounted within a frame 40 through the hub 34 so that the wheel 30 is free to rotate. A motor 42 is mounted within the frame 40 to rotate the total energy recovery wheel 30 via an endless belt (not shown) which engages the rim 38 of the total energy recovery wheel 30.

Generally, total energy recovery wheels 30 are on the order of from about 8 inches to about 1 foot in depth and from about 2 feet to about 14 feet in diameter.

In use, the total energy recovery wheel 30 is mounted within a frame 34 so that the total energy recovery wheel 30 is free to rotate. The frame 34 is disposed between the inlet and exhaust air streams of a heating and cooling system and is oriented so that the corrugations 22 of the corrugated sheet material 18 of the sensible and latent heat exchange media 10 of the total energy recovery wheel 30 provide passageways 14 extending axially through the sensible and latent heat exchange media 10. Thus, the air streams can flow from one side of the wheel to the other. Typically, the inlet and exhaust air streams flow in opposite directions simultaneously through different portions of the total energy recovery wheel 30. As the wheel 30 rotates, generally about twenty revolutions per minute, the portions of the total energy recovery wheel 30 are alternately in contact with the inlet and exhaust air streams. The portions of the total energy recovery wheel 30 are in contact with both air streams, at different times, during each revolution. As the air streams flow through the sensible and latent heat exchange media 10 of the total energy recovery wheel 30, the sensible and latent heat exchange media 10 absorbs heat and moisture from the warmer, more humid air stream and releases heat and moisture to the cooler, drier air stream.

In the cooling mode, the total energy recovery wheel 30 cools and dries the warm, humid incoming air stream. The portion of the sensible and latent heat exchange media 10 of the total energy recovery wheel 30 in contact with the incoming air stream absorbs heat and moisture from the warm, humid incoming air stream. As the total energy recovery wheel 30 rotates so that that portion of the sensible and latent heat exchange media 10 is in contact with the outgoing air stream, the heat and moisture absorbed by the sensible and latent heat exchange media 10 of the total energy recovery wheel 30 are then transferred to the cool, dry outgoing air stream. The process is repeated continuously as the total energy recovery wheel 30 continues to rotate. As a result, the energy necessary to further cool and dehumidify the incoming air stream to the desired temperature and humidity is reduced.

In the heating mode, the total energy recovery wheel 30 heats and humidifies the cool, dry incoming air stream. The portion of the sensible and latent heat exchange media 10 of the total energy recovery wheel 30 in contact with the outgoing air stream absorbs heat and moisture from the warm, humid outgoing air stream. As the total energy recovery wheel 30 rotates so that that portion of the sensible and latent heat exchange media 10 is in contact with the incoming air stream, the heat and moisture absorbed by the sensible and latent heat exchange media 10 of the total energy recovery wheel 30 are then transferred to the cool, dry incoming air stream. The process is repeated continuously as the total energy recovery wheel 30 continues to rotate. As a result, the energy necessary to further heat and humidify the incoming air stream to the desired temperature and humidity is reduced.

Figure 3:
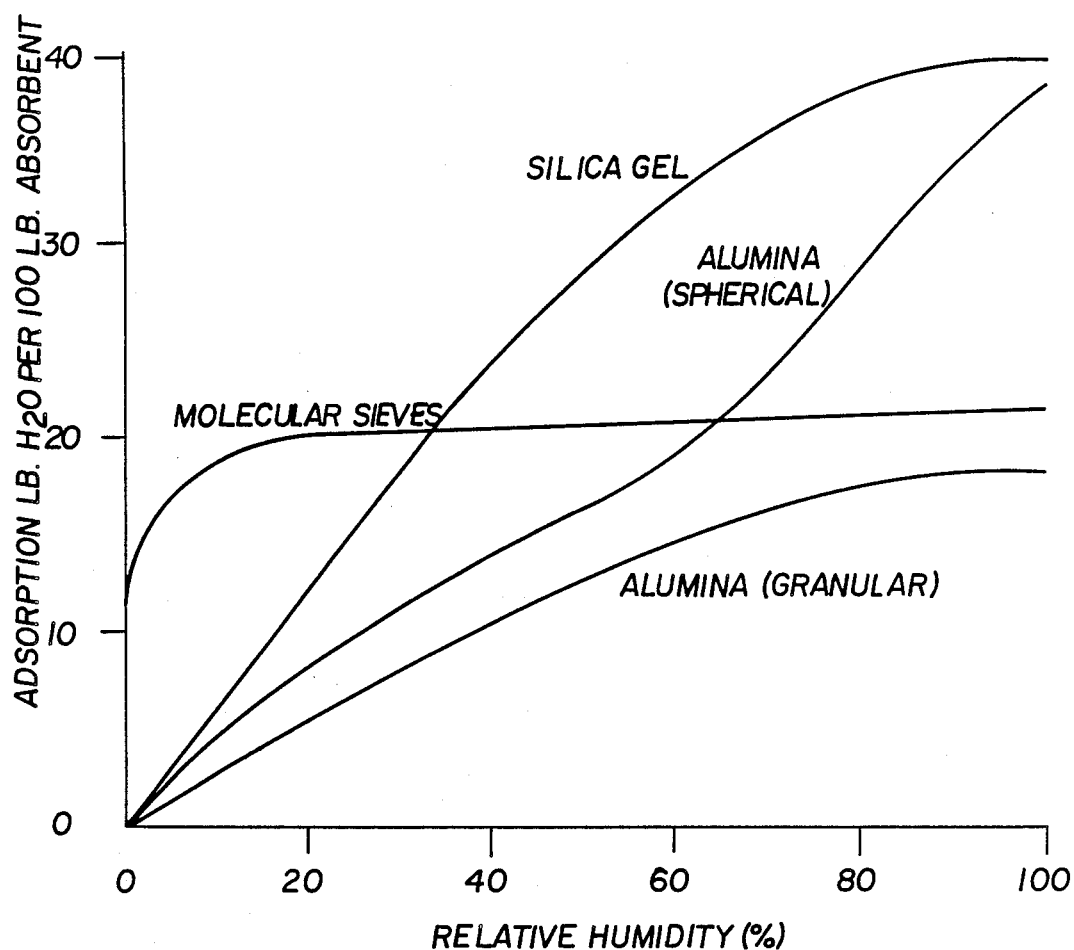
FIG. 3 is a typical, readily available, comparison of the equilibrium water adsorption capacity of several desiccants, including the molecular sieves used in the sensible and latent heat exchange media of the invention, at various relative humidities.
Figure 4:
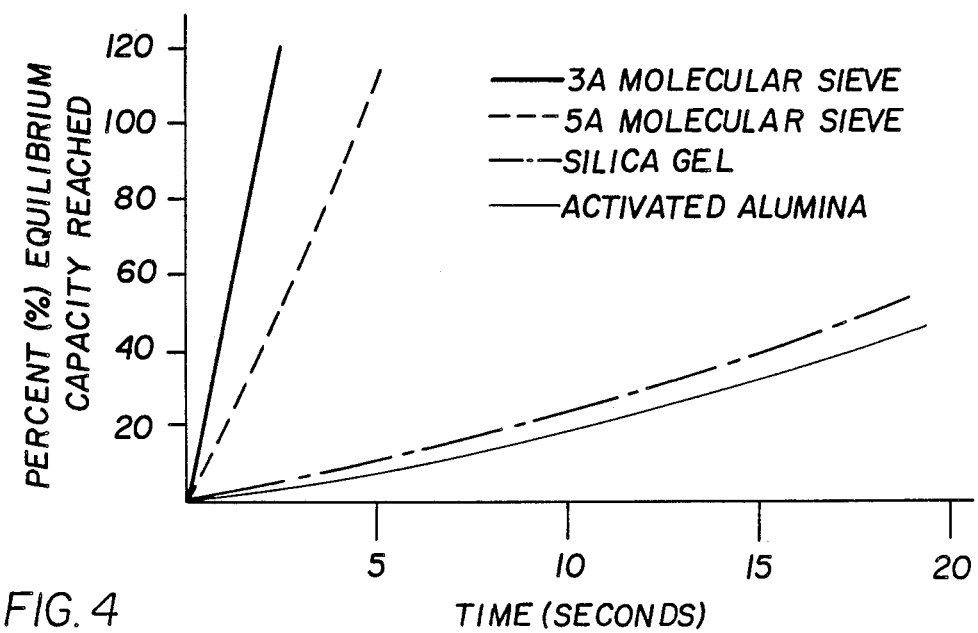
FIG. 4 is a comparison of the relative moisture adsorption rates of several desiccants, including the molecular sieves used in the sensible and latent heat exchange media of the invention.

As shown in FIG. 3, the overall capacity for molecular sieves to absorb moisture does not increase appreciably between 20 percent and 90 percent relative humidity. In contrast, the overall capacity of silica gel to absorb moisture nearly triples between 20 percent and 90 percent relative humidity. However, as shown in FIG. 4, molecular sieves reach their equilibrium capacities at a very fast rate as compared to other desiccants, such as silica gel and activated alumina, used in currently available sensible and latent heat exchange media 10. More specifically, the 3 Angstrom and 5 Angstrom molecular sieves reach 100 percent of their equilibrium capacities in less than 5 seconds, whereas silica gel and activated alumina require more than 30 seconds to reach their equilibrium capacities. More importantly, the silica gel and activated alumina reach only about 10 percent of their equilibrium capacity within the first 3 seconds.

The information presented in FIG. 4 was prepared by coating aluminum substrates with a coating of a 3A molecular sieve, 5A molecular sieve, silica gel and activated aluminum. The coating thicknesses and weight of desiccant per pound of aluminum were similar. The coated aluminum was formed into media samples of alternating flat and corrugated strips, having a depth of about 1 inch. The samples were allowed to reach equilibrium at 95° F. DB/78° F. WB, 47 percent relative humidity, a vapor pressure of 0.78 inch Hg, and a water vapor partial pressure of 9.3 millimeters of Hg. Air, at 70° F. DB/61° F. WB, 60 percent relative humidity, a vapor pressure of 0.45 inch of Hg, and a water vapor partial pressure of 6.86 millimeters of Hg, was passed through the sample at a rate of about 600 feet/minute. The weight of the samples was recorded after various periods of time.

The percentage of equilibrium capacity of the desiccant reached by the particular time was calculated by first dividing the weight gain of the sample by the initial weight of dry desiccant to determine the weight gain of the sample per pound of dry desiccant. Then, the percentage of equilibrium capacity of the desiccant reached by the particular time was determined by dividing the weight gain of the sample per pound of dry desiccant by the equilibrium capacity of the desiccant as determined from FIGS. 5 and 6.

Figure 5:
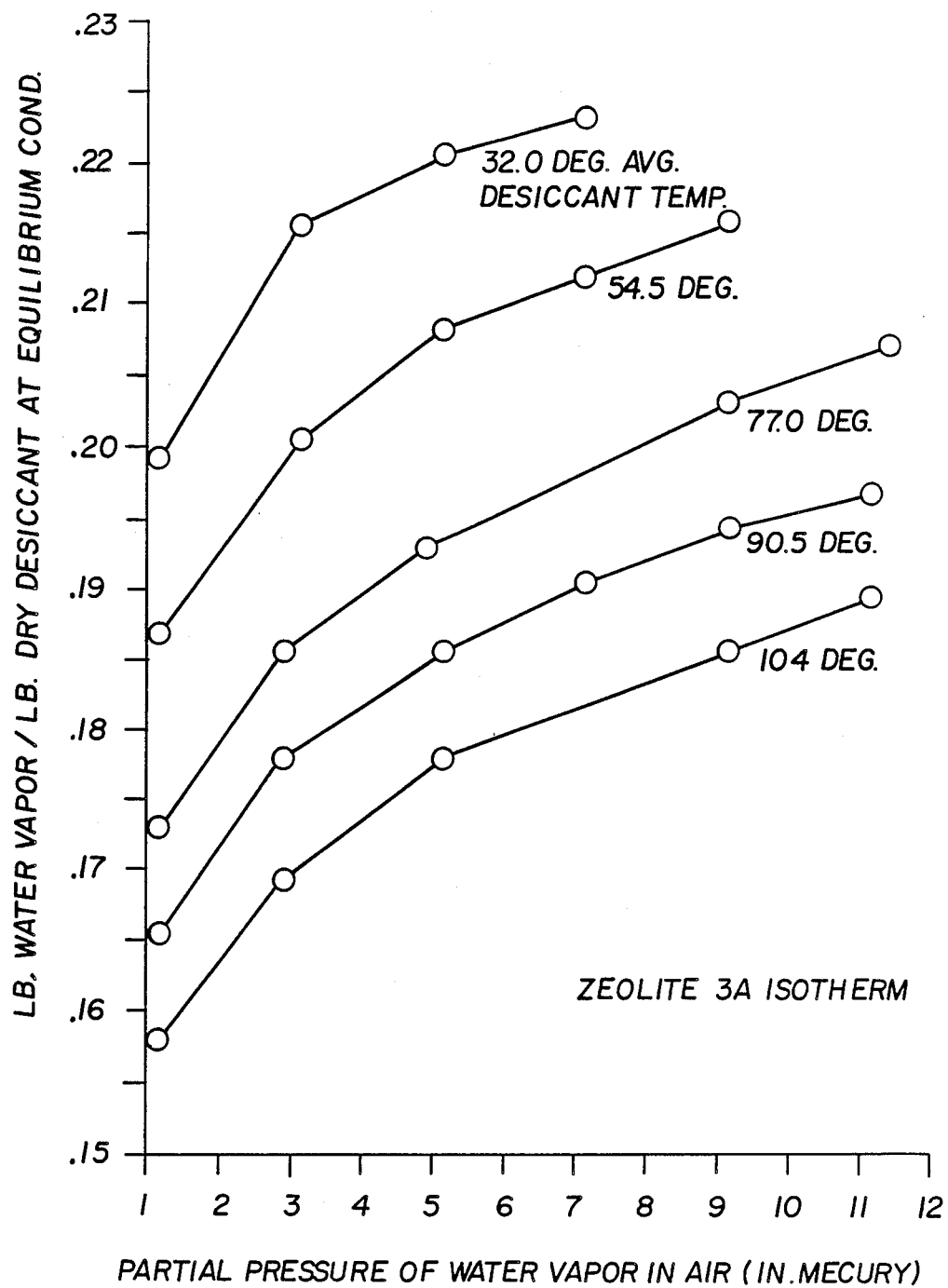
FIG. 5 is a typical, readily available, comparison of the equilibrium water absorption capacity of a 3 Angstrom molecular sieve at various water vapor partial pressures and various desiccant temperatures.
Figure 6:
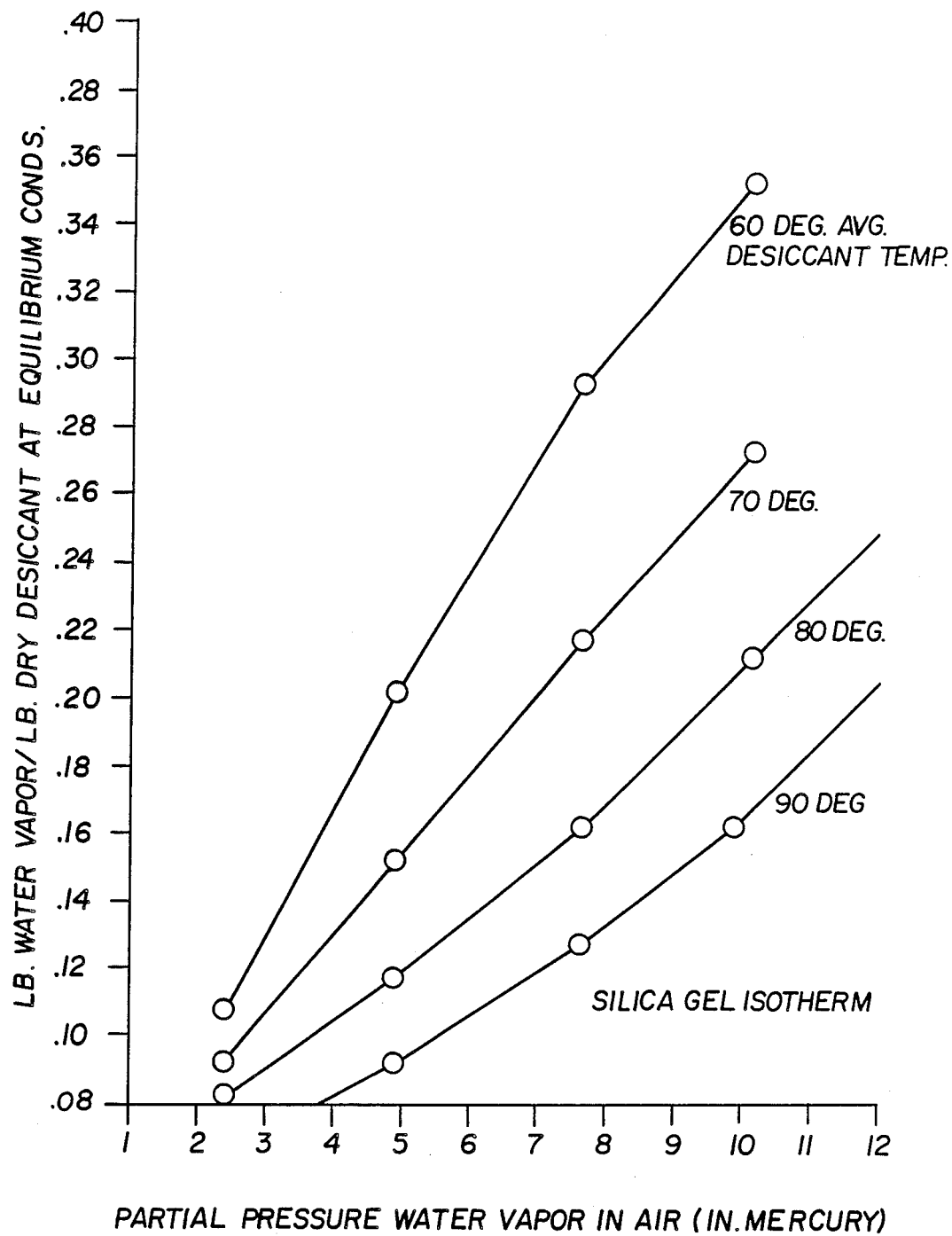
FIG. 6 is a typical, readily available, comparison of the equilibrium water absorption capacity of silica gel at various water vapor partial pressures and various desiccant temperatures.

FIGS. 5 and 6 illustrate the equilibrium moisture capacity of a 3 Angstrom molecular sieve and silica gel, respectively, at various water vapor partial pressures and temperatures. It can be seen from FIGS. 5 and 6 that silica gel has a greater increase in equilibrium capacity as the partial pressure of water vapor in the air increases than does a 3 Angstrom molecular sieve.

The overall effectiveness of a 3 Angstrom molecular sieve as a desiccant for a total energy recovery wheel was compared to that of silica gel by combining the information found in FIGS. 4, 5 and 6. As can be seen from FIG. 6, the capacity of silica gel to adsorb water increases about 0.041 pounds of water per pound of dry desiccant between 95° F. DB/78° F. WB, 47 percent relative humidity, a vapor pressure of 0.78 inch Hg, and a water vapor partial pressure of 9.3 millimeters of Hg and 70° F. DB/61° F. WB, 60 percent relative humidity, a vapor pressure of 0.45 inch of Hg, and a water vapor partial pressure of 6.86 millimeters of Hg. The desiccant temperature is approximated by the average temperature of the air streams, or 82.5° F. On the other hand, as can be seen from FIG. 5, the capacity of a 3 Angstrom molecular sieve increases only 0.008 pounds of water per pound of dry desiccant under the same conditions. It can be seen from FIG. 4 that the percentage capacity of the silica gel and the 3 Angstrom molecular sieve to adsorb water after 1.5 seconds was 5 percent and 70 percent, respectively. It follows that the actual transfer capacities of the silica gel and 3 Angstrom molecular sieves are 0.00205 pounds of water per pound of dry desiccant and 0.0056 pounds of water per pounds of dry desiccant, respectively. Thus, under the conditions to which the total energy recovery wheels are exposed, the 3 Angstrom molecular sieve has a latent heat transfer ability superior to that of the silica gel.

Figure 7:
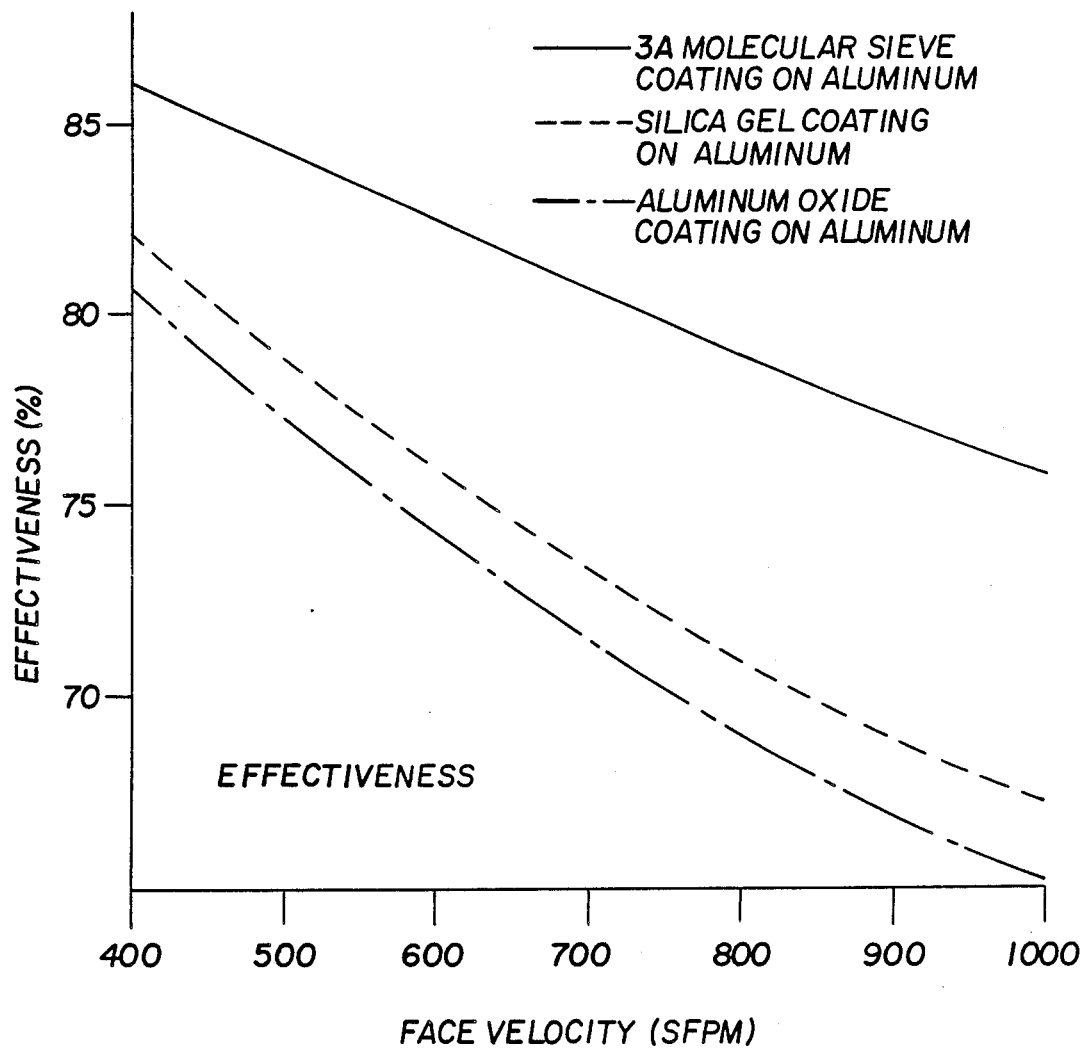
FIG. 7 is a total enthalpy performance comparison of several sensible and latent heat exchange media, including one formed according to the subject invention.

A comparison of the overall effectiveness percentage of overall capacity reached at various face velocities of sensible and latent heat exchange media using various desiccants, including the molecular sieve of the invention is shown in FIG. 7. Samples using the molecular sieve desiccant of the invention were prepared and evaluated according to ASHRAE (American Society of Heating Refrigeration and Air-Conditioning Engineers) test 84-78P. The performance of media using silica gel and aluminum oxide was derived from readily available literature evaluating typical media using those desiccants. The data were obtained according to ASHRAE test 84-78P. The sensible and latent heat exchange media of the invention exhibited an ability to transfer sensible and latent heat superior to that of media using desiccants such as silica gel and aluminum oxide.

The sensible and latent heat exchange media 10 of the invention will adsorb moisture without also adsorbing contaminants from the outgoing air stream and recirculating them with the incoming air stream. The molecular sieve in the coating composition will not adsorb any of the contaminants in the air stream due to the specific pore size of the molecular sieve, which is smaller than the critical diameter of the contaminant molecules. The polarity of the molecular sieve also provides preferential adsorption of water molecules over similarly sized molecules of other substances that are less polar than water molecules. Thus, the sensible and latent heat exchange media 10 of the invention is more efficient in absorbing and releasing both sensible and latent heat, and as a result, total energy recovery wheels 30 utilizing the sensible and latent heat exchange media 10 of the invention can be more compact than those currently available. Although the subject invention has been described in use primarily with respect to HVAC systems, the invention is applicable to many other industrial processes that require the removal of moisture and sensible heat from an air stream.

What is claimed is:

1. A sensible and latent heat exchange media comprising:
a gas permeable matrix, said gas permeable matrix providing passageways therethrough through which an air stream can flow through said sensible and latent heat exchange media, and
said gas permeable matrix being formed of a sensible heat exchange material that is capable of absorbing sensible heat from a warm air stream and releasing said absorbed sensible heat into a cool air stream as said air streams flow through said sensible and latent heat exchange media, and a layer of a coating composition comprising a cationic molecular sieve applied to at least a portion of the surface of said sensible heat exchange material, said molecular sieve having a plurality of pores of a substantially uniform size and a pore diameter of about 3 Angstroms such that said molecular sieve is capable of adsorbing moisture from a humid air stream flowing through said sensible and latent heat exchange media, and is capable of releasing said adsorbed moisture into a dry air stream flowing through said sensible and latent heat exchange media in a time period of less than about 1.5 seconds.

2. The sensible and latent heat exchange media of claim 1 in which said sensible heat exchange material is in the form of a sheet material and said gas permeable matrix is a plurality of spaced layers of said sheet material.

3. The sensible and latent heat exchange media of claim 2 in which said sheet material of said sensible heat exchange material is from about 1 mil to about 3 mils thick.

4. The sensible and latent heat exchange media of claim 2 in which said spaced layers of sheet material are alternating layers of a corrugated sheet material and a flat sheet material.

5. The sensible and latent heat exchange media of claim 4 wherein said corrugations of said corrugated sheet material are substantially parallel to each other and are from about 50 mils to about 100 mils high and from about 100 mils to about 200 mils wide.

6. The sensible and latent heat exchange media of claim 2 in which said coating composition is applied to both sides of said sensible heat exchange material.

7. The sensible and latent heat exchange media of claim 1 in which said sensible heat exchange material is metal.

8. The sensible and latent heat exchange media of claim 7 in which said sensible heat exchange material is aluminum.

9. The sensible and latent heat exchange media of claim 1 in which said layer of coating composition is at least about 0.5 mil thick.

10. The sensible and latent heat exchange media of claim 1 wherein said molecular sieve is a zeolite.

11. The sensible and latent heat exchange media of claim 10 wherein said zeolite is an alumino silicate.

12. The sensible and latent heat exchange media of claim 1 wherein said sensible and latent heat exchange media is from about 8 inches to about 1 foot in depth.

13. A total energy recovery wheel comprising:
a hub;
a sensible and latent heat exchange media having a gas permeable matrix, said gas permeable matrix providing passageways therethrough through which an air stream can flow through said sensible and latent heat exchange media, and being formed of a sensible heat exchange material that is capable of absorbing sensible heat from a warm air stream and releasing said absorbed sensible heat from a warm air stream and releasing said absorbed sensible heat into a cool air stream as said air streams flow through said sensible and latent heat exchange media, and a layer of a coating composition comprising a cationic molecular sieve applied to at least a portion of the surface of said sensible heat exchange material, said molecular sieve having a plurality of pores of a substantially uniform size and a pore diameter of about 3 Angstroms such that said molecular sieve is capable of adsorbing moisture from a humid air stream flowing through said sensible and latent heat exchange media, and is capable of releasing said adsorbed moisture into a dry air stream flowing through said sensible and latent heat exchange media in a time period of less than about 1.5 seconds;
means for supporting said sensible latent heat exchange media circumferentially about said hub; and
drive means for rotating said total energy recovery wheel.

14. The total energy recovery wheel of claim 13 in which said sensible heat exchange material is in the form of a sheet material and said gas permeable matrix is a plurality of spaced layers of said sheet material.

15. The total energy recovery wheel of claim 14 in which said sheet material of said sensible heat exchange material is from about 1 mil to about 3 mils thick.

16. The total energy recovery wheel of claim 14 in which said spaced layers of sheet material are alternating layers of a corrugated sheet material and a flat sheet material.

17. The total energy recovery wheel of claim 16 wherein said corrugations of said corrugated sheet material are substantially parallel to each other and are from about 50 mils to about 100 mils high and from about 100 mils to about 200 mils wide.

18. The total energy recovery wheel of claim 14 in which said coating composition is applied to both sides of said sensible heat exchange material.

19. The total energy recovery wheel of claim 13 in which said sensible heat exchange material is metal.

20. The total energy recovery wheel of claim 19 in which said sensible heat exchange material is aluminum.

21. The total energy recovery wheel of claim 13 in which said layer of coating composition is at least about 0.5 mil thick.

22. The total energy recovery wheel of claim 13 wherein said molecular sieve is a zeolite.

23. The total energy recovery wheel of claim 22 wherein said zeolite is an alumino silicate.

24. The total energy recovery wheel of claim 13 wherein said latent and sensible heat exchange media is from about 8 inches to about 1 foot in depth.

* * * * *